E. GRAY.

ELECTRO-MAGNETIC ANNUNCIATOR.

No. 6,825. Reissued Dec. 28, 1875.

Witnesses:

Heinrich L. Bruns.

L. A. Bunting

Elisha Gray,

Inventor:

By Coburn & Thacher

Attys.

N. PETERS, Photo-Lithographer, Washington, D. C.

UNITED STATES PATENT OFFICE.

ELISHA GRAY, OF CHICAGO, ILLINOIS.

IMPROVEMENT IN ELECTRO-MAGNETIC ANNUNCIATORS.

Specification forming part of Letters Patent No. 118,231, dated August 22, 1871; reissue No. 6,825, dated December 28, 1875; application filed December 2, 1875.

*To all whom it may concern:*

Be it known that I, ELISHA GRAY, of Chicago, in the county of Cook and State of Illinois, have invented a new and useful Improvement in Electro-Magnetic Annunciators; and I do hereby declare the following to be a full, clear, and exact description thereof, which will enable others skilled in the art to which my invention appertains to make and use the same, reference being had to the accompanying drawing, forming part of this specification, in which—

Figure 1:
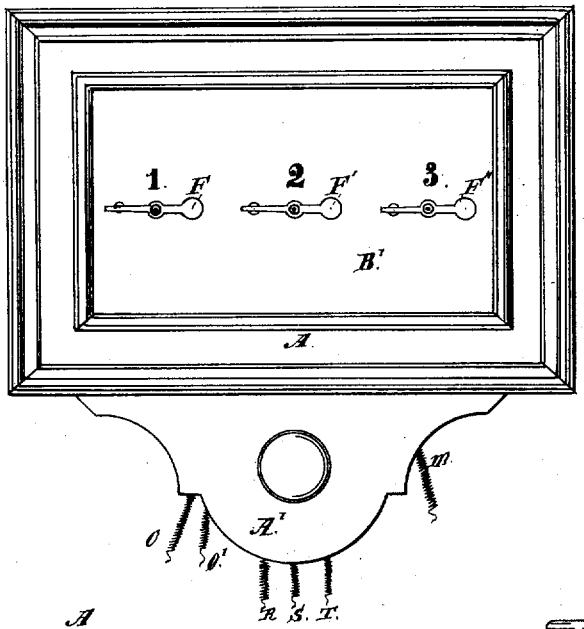
Figure 5:
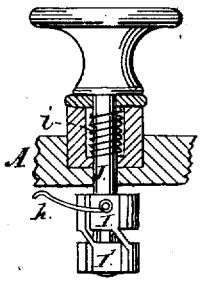
Figure 2:
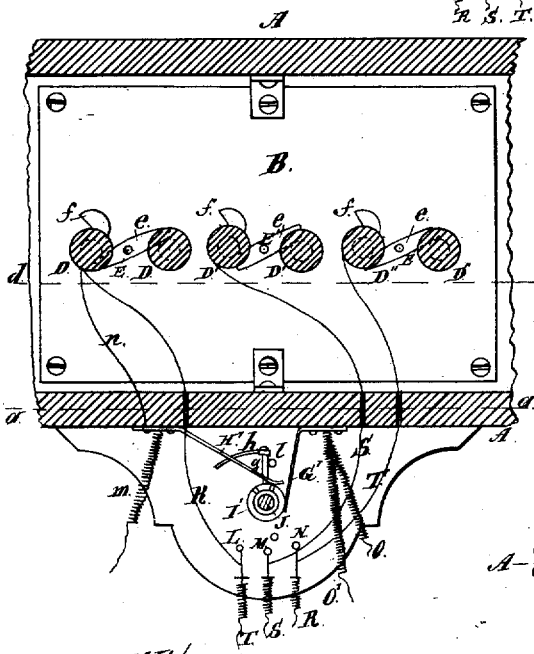
Figure 3:
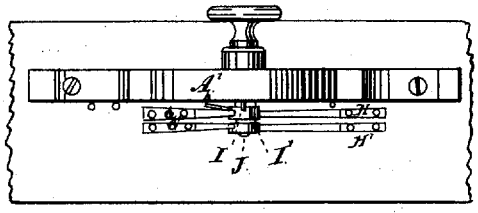
Figure 4:
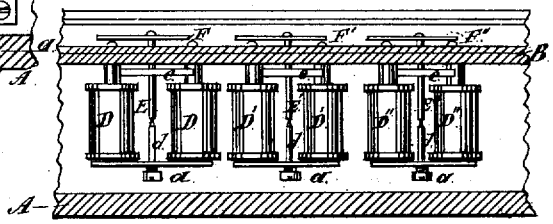

Figure 1 is a front view of my annunciator. Fig. 2 is an inverted transverse longitudinal section of the same. Fig. 3 is a side elevation taken on line *a a*. Fig. 4 is a vertical longitudinal section on line *d d*, and Fig. 5 is an enlarged detached section of the knob employed in reversing the electric current.

Similar letters of reference indicate corresponding parts in the several figures of the drawing.

The object of my invention is to provide an annunciator for the use of hotels and other similar public buildings, by which the number of the room or rooms from which the call is made may be indicated upon the dial.

The invention consists in an electro-magnetic arrangement communicating from the apartment with the dial; and also in the combination of a dial, bearing numbers corresponding to different rooms and indicating-points, as will be hereinafter fully described.

In the accompanying drawing, A represents the case, which may be as shown, or of any known form, which will receive the operating parts of the instrument. B is a metal plate, which is firmly affixed to the inner side of said case, and upon which are mounted the electro-magnets D D′ D″. The dial B′ is placed directly in front of the plate B, to which it may be secured. Numbers or other marks corresponding to the designations of different rooms in the building are placed upon the dial in any suitable manner, and under any convenient arrangement. Each limb of said magnets is connected at its opposite ends from the plate by metal heel-pieces *a a a*, firmly affixed to the arbor or bearing of the same. E E′ E″ are shafts, one end of which have a bearing within plate B, and are pivoted at the opposite end to or upon set-screws *d d d*, which are secured within straps *a*, by which the same are held in proper adjustment. Affixed upon said shafts, between plate B and the end of the magnets, are steel needles or armatures *e e e*, which are properly hardened and magnetized. Said needles or armatures are so arranged as to have an automatic tilting movement by the reciprocal rocking movement of the shafts, imparted thereto by the electrical current from the magnets. Attached to the plate B are lugs *f f f*, which are so arranged as to prevent the said armatures from coming in contact with and against the poles of the electro-magnets, as the same are tilted by the electrical current. Said lugs are usually made of cork, but they may be made of any suitable material.

F F′ F″ are light metal indicating-pointers, which are firmly affixed to the outer ends of said arbors in front of plate B, immediately under the figures marked upon the dial. Attached to the outer side of the case are metal springs G G′ and H H′, which are bent in proper shape to bring their outer ends in contact with and against metallic rings I and I′ affixed upon the knob-spindle J, which is secured to the projecting portion A′ of the case. Said rings are insulated one from the other, and their periphery cut into two separate parts, forming in each a long and short section. The short section of ring I is connected to the long section of ring I′, and the short section of ring I′ is connected to the long section of ring I, by which the electrical current is conveyed from one to the other. Affixed to the short section of ring I is a pin or pivot, *g*, to which is attached a curved spring, *h*, so arranged as to come in contact with and pass over points L, M, and N, which are permanently attached to projection A′ of the case, as said knob or commutator is revolved, the same being so arranged as to admit of a reciprocal semi-annular rotary movement. Attached to and upon the knob-spindle J of the commutator is a coiled spring, *i*, which is so arranged as to force the said knob back to its proper position, as the same is rotated partially around, and firmly holding the same against a stop-pin, *l*, secured in the said projection. Affixed to the said points L, M, and N are wires R, S, and T, which are each attached at one end to the magnets D D′ D″, the opposite ends of each leading to different rooms, having numbers corresponding with the numbers indicated upon the dial. Within each separate room is secured a circuit-closer, the manipulation of which causes a contact between the wire communicating with the room and the common return-wire *m*. One end of each wire R, S, and T is soldered to the core of the magnets D D′ D″, which are in direct contact with the plate B. Affixed to the core of the magnet D is a wire, *n*, which communicates with spring H. Firmly attached to springs G G′ are wires O O′, which are connected with the poles of a galvanic battery.

The operation of my invention is as follows: As the occupant of room No. 1, for instance, manipulates the circuit-closer, the electrical current will pass from wire O′ through spring G′, long section of ring I′, short section of ring I, spring H, to the common return-wire *m*; thence through the room to wire R; thence through magnet D, plate B, spring G, long section of ring I, short section of ring I′, spring H, and wire O, to the pole of the battery, the electrical current having passed through magnet D in such a direction as to develop a polarity similar to that already in the approximate poles of the needle-armature *e*; hence a mutual repulsion takes place between the approximate poles of the magnets, and a mutual attraction between the more distant ones, the object of which is to tilt needle *e* to a reversed position, which carries pointer F upon Figure 1 of the dial, the same current ringing a bell secured upon the return-wire. The call having been made, and the number of the room noted, it now remains to restore the pointer to its former position, which is done by turning the knob of the commutator until spring *h* makes a contact with point N, thus changing springs H H′ from the short sections of rings I and I′, which brings spring H′ in direct contact with spring G′, and spring H with spring G, by which means the electrical current passes from wire O to and through spring G′ through the long section of ring I′, short section of ring I, spring H, metal point N, wire R, magnet D, plate B, spring H, long section of ring I, spring G, and wire O′, to the pole of the battery. Thus the electrical current will pass through magnet D in a reverse direction from that which was produced by the manipulation of the room circuit-closer, by which a reverse effect is produced upon the needle *e*, which restores pointer F to its original position. The same operation may be repeated in a like manner with any other number, which will produce a corresponding result.

Having thus described my invention, what I claim as new, and desire to secure by Letters Patent, is—

1. The arrangement of circuits for operating the needle or armature *e* either forward or backward by the electrical current, substantially as and for the purpose set forth.

2. The commutator J of an electro-magnetic annunciator, constructed and arranged to operate substantially as and for the purpose specified.

3. The springs G G′, H H′, and wires R S T, in combination with rings I and I′ of the commutator J, the whole arranged substantially as and for the purpose described.

4. The spring *h*, in combination with points L, M, and N, arranged as described, whereby the electrical current is reversed, substantially as and for the purpose specified.

5. The combination, substantially as described, of a dial, bearing numbers or other characters corresponding to the designations of different rooms in a building, and movable indicating-pointers corresponding to the characters upon the dial, as and for the purposes set forth.

ELISHA GRAY.

Witnesses:

HEINRICH F. BRUNS,

L. A. BUNTING.